Figure 1:
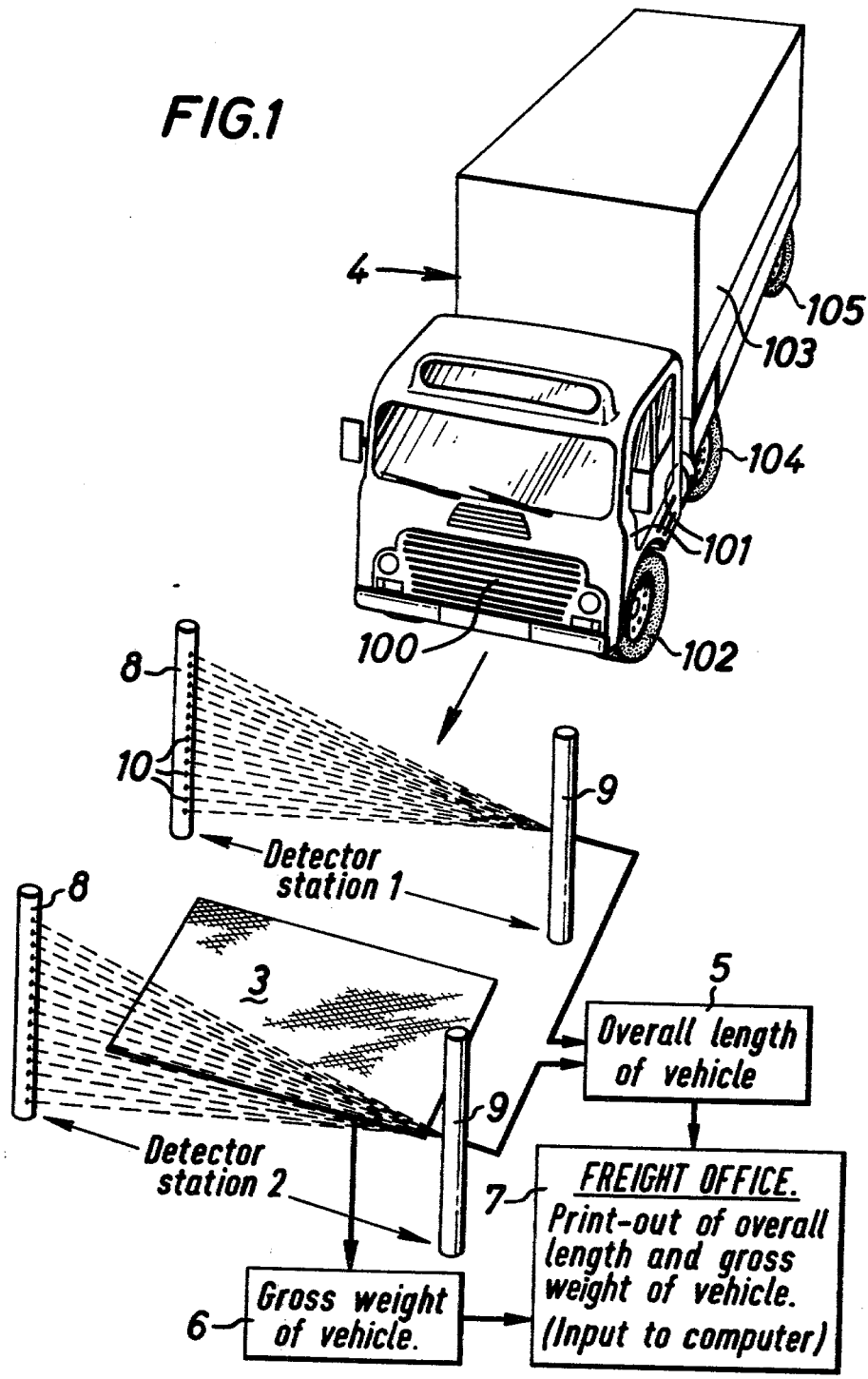

United States Patent [19]

Elmer et al.

[11] 4,247,768
[45] Jan. 27, 1981

[54] VEHICLE VELOCITY RELATED MEASURING SYSTEMS

[75] Inventors: Peter J. Elmer, Upper Dover Court; Maurice F. Kimmit, Colchester; William S. Matheson, Bury St. Edmunds; Arthur Roberts, Huntingdon, all of England

[73] Assignee: British Railways Board, London, England

[21] Appl. No.: 965,213

[22] Filed: Nov. 30, 1978

[51] Int. Cl.³ .............................................. G01D 21/04
[52] U.S. Cl. ................................... 250/222 R; 364/562
[58] Field of Search ...................... 250/222, 221, 560; 324/178; 364/560, 562

[56] References Cited

U.S. PATENT DOCUMENTS

| 3,872,283 | 3/1975 | Smith et al. | |
| 4,088,411 | 5/1978 | Ahlquist et al. | 250/560 X |
| 4,128,761 | 12/1978 | Oehler | 250/222 R |
| 4,152,767 | 5/1979 | Laliotis | 250/560 X |

FOREIGN PATENT DOCUMENTS 2161757  7/1973  France.
2315135  1/1977  France.
960922  6/1964  United Kingdom.

Primary Examiner—David C. Nelms
Assistant Examiner—Darwin R. Hostetter
Attorney, Agent, or Firm—Pollock, Vande Sande & Priddy

[57] ABSTRACT

A measuring system particularly for measuring the length of a moving vehicle comprises a pair of detector stations spaced a known distance apart along a path of vehicle movement each detector station comprising a vertically extending series of electromagnetic radiation beam-emitters disposed on one side of the path and at least one detector disposed on the other. The beams from the emitters are aimed at the detector so that each part of the vehicle when disposed between the emitters and detector will interrupt some of the beams to produce a characteristic quantity of incident electromagnetic radiation on the detector which will serve to identify that part of the vehicle. Data processing means are provided for processing the outputs from the detectors at the two stations to provide a velocity related vehicle measurements.

14 Claims, 5 Drawing Figures

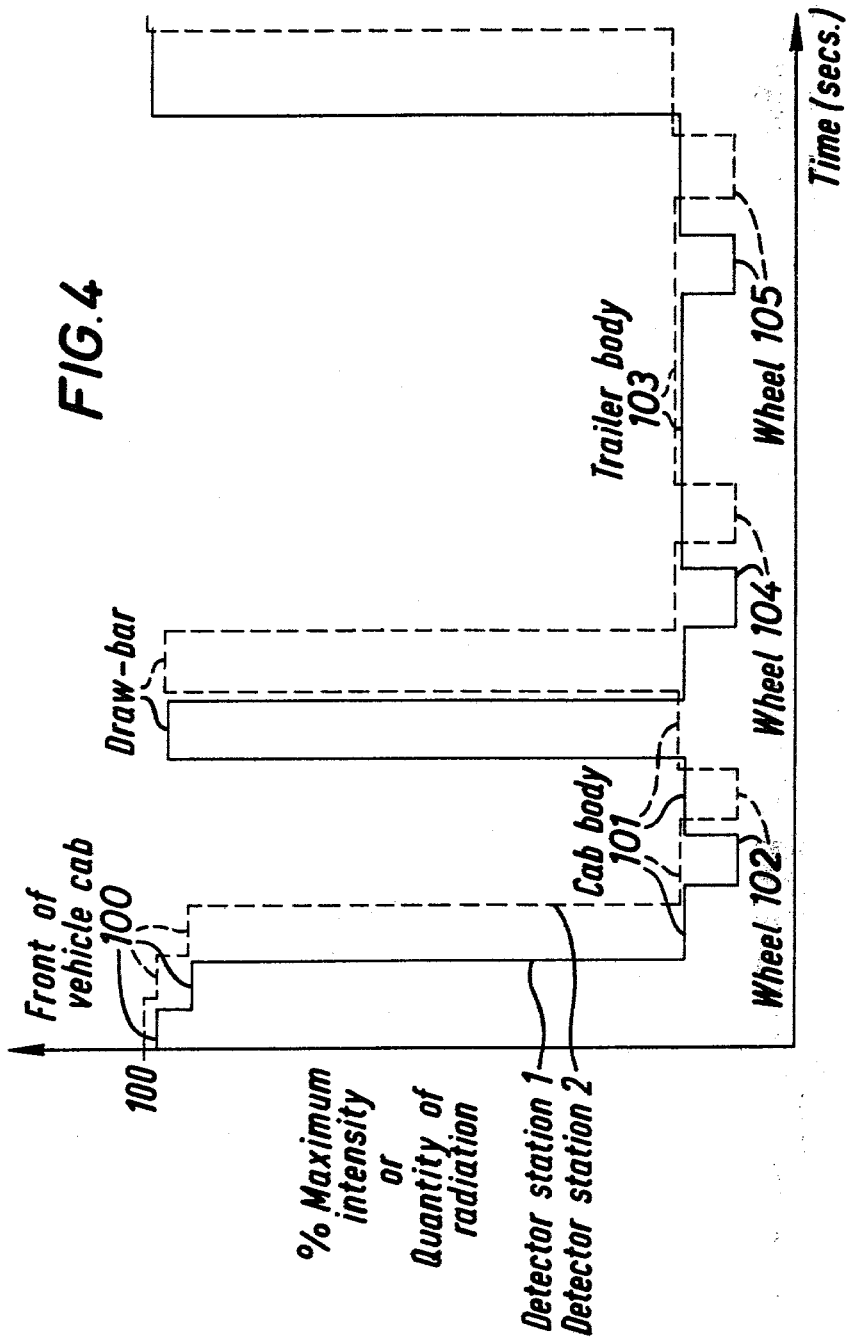

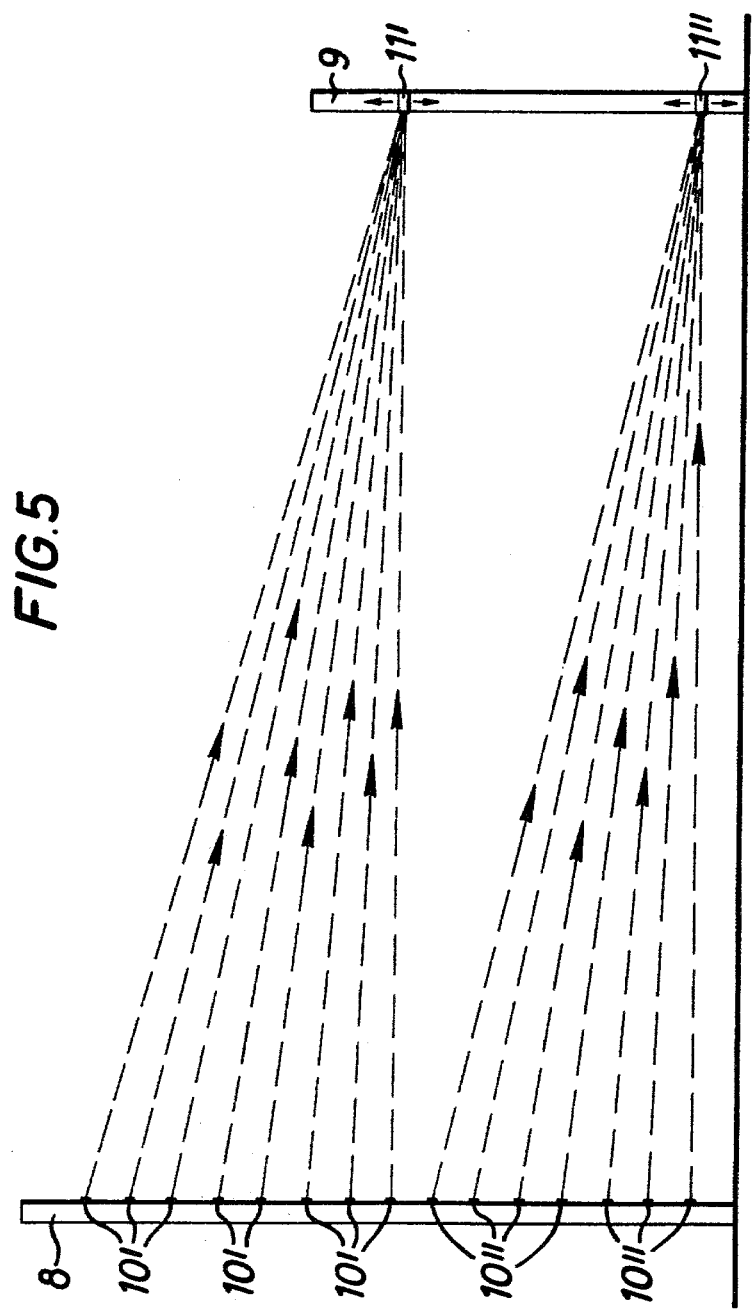

VEHICLE VELOCITY RELATED MEASURING SYSTEMS

This invention relates to measuring systems and has particular, but not exclusive, application to the measurement of the length of moving vehicles.

In the transportation of commercial road vehicles by sea ferries, the tariff charged is based, inter alia, on vehicle length. The tariff is normally expressed as a charge per meter with a gradation down to 0.1 meter which is charged proportionally. At the present time the declared lengths of vehicles are checked on a random basis to discourage under-declarations of length. This checking is carried out by inspectors using tape-measures or the like and has to be carried out while the vehicles are stationary; it is therefore time-consuming and labour intensive.

The main object of the present invention is to provide a measuring system which enables he length of a vehicle to be measured automatically while the vehicle is moving.

Accordingly the present invention provides a measuring system comprising:

(a) a pair of detector stations spaced a predetermined distance apart along a path of movement for a vehicle, each detector station comprising a vertically extending series of electromagnetic radiation emitters disposed on one side of said path, each emitter producing a directional beam of radiation, and at least one electromagnetic radiation detector which is designed to produce an electrical output signal related to the quantity or intensity of radiation incident upon it, said detector being disposed on the other side of said path and said emitters or a group of said emitters being arranged to direct their beams as it, whereby the said quantity or intensity of incident electromagnetic radiation registered by said detector is dependent upon the number of said beams intercepted by a passing vehicle, and (b) data processing means for processing the output signals from said detectors on a time basis and utilising the known predetermined spacing of said detector stations to provide a velocity related vehicle measurement.

Said electromagnetic radiation is advantageously infra-red radiation.

Thus the measuring system of the invention can be used to measure vehicle length and/or vehicle velocity.

As will be explained the measurement of vehicle length is a function of vehicle velocity, which in turn is a function of the time taken for an identifiable point on the vehicle to cover the known distance between the two detector stations. With the above defined emitter and detector arrangements at the two detector stations, a vehicle as it passes each detector station will produce on the detector a radiation intensity or quantity pattern determind by the number of said radiation beams which are interrupted by each cross-section of the vehicle passing through that station. From these patterns certain characteristic points along the vehicle are readily identifiable. Hence a measurement of the time taken for a number of identifiable points to move between the two stations can be made and an average transit time arrived at, which will compensate within limits for variation in vehicle velocity as it is moving between the two stations.

One of the characteristic points which is identifiable by pattern recognition are vehicle axles. The system can therefore additionally be used to count the number of vehicle axles, and this in combination with a weight measurement can provide information regarding axle loading.

The measuring system of the present invention can readily be incorporated into a comprehensive vehicle data system. Thus the measuring system can be installed adjacent a dynamic weighbridge system and the information provided by the two systems can be fed to a data base where it is combined with other relevant vehicle data, to provide a composite read-out of all this data.

Figure 2:
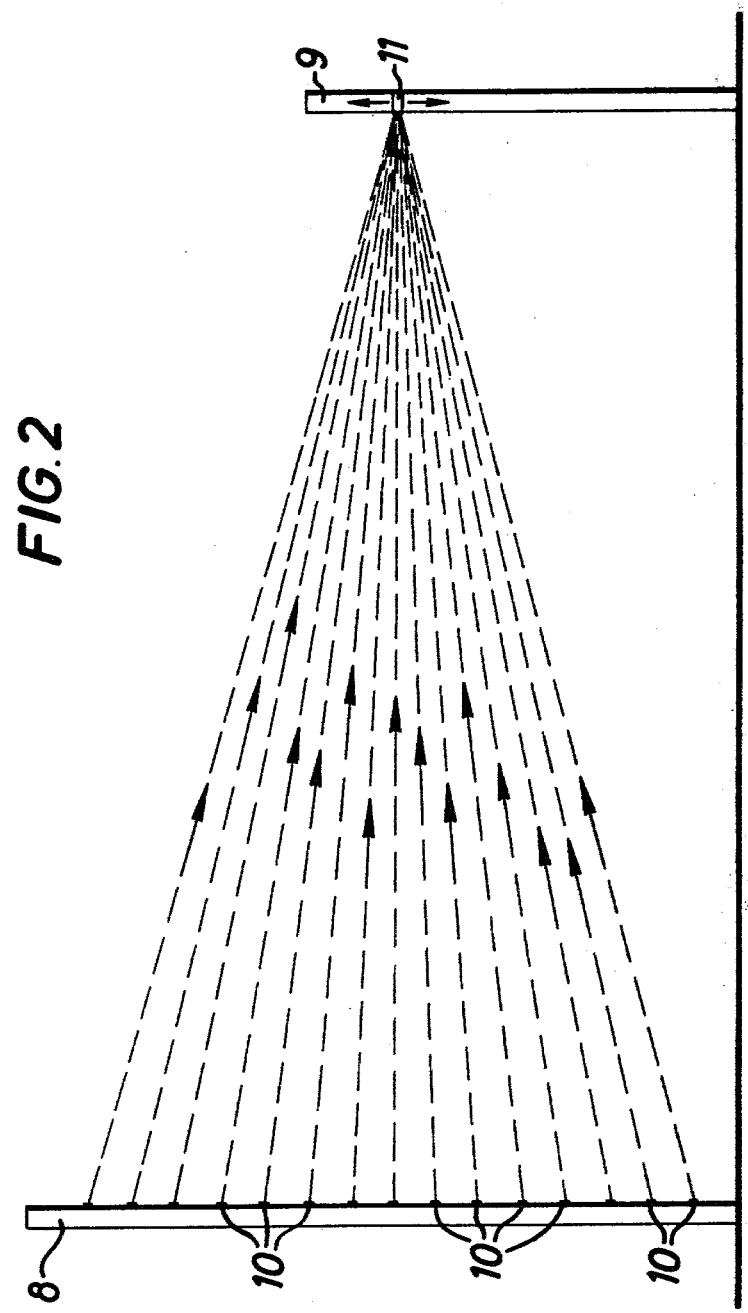
Figure 3:
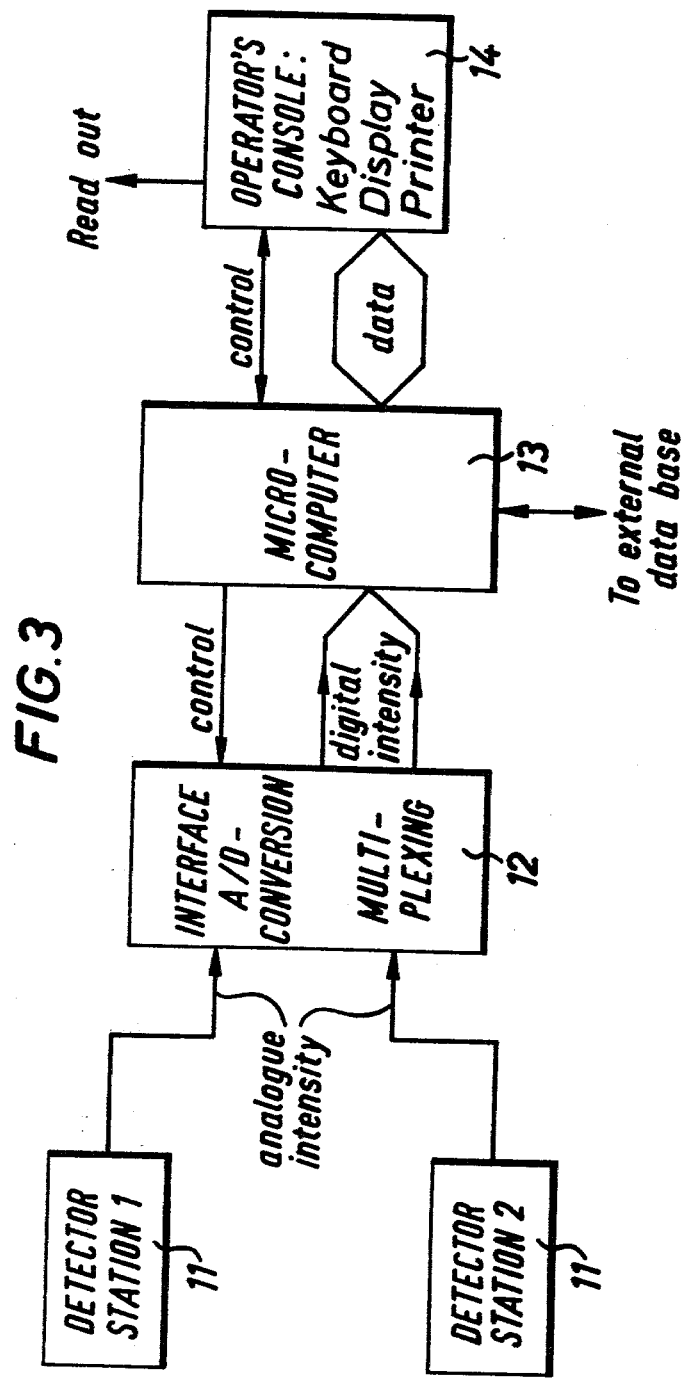

One embodiment of the measuring system of the invention as applied to vehicle length measurement will now be described by way of example with reference to the accompanying diagrammatic drawings, in which:

FIG. 1 shows the measuring system in association with a dynamic weighbridge,

FIG. 2 shows a view of one of the detector stations as seen by the vehicle moving along its path of travel, FIG. 3 shows a block circuit diagram of the data processing means for processing the output signals from the detector stations, FIG. 4 shows radiation intensity or quantity patterns on a time base as a vehicle moves past the detector stations, and FIG. 5 shows a view similar to FIG. 2 of a modified detector station.

Referring to the drawings, the measuring system comprises two detector stations 1 and 2, which in effect form gateways at either end of a dynamic weighbridge 3 so that a vehicle 4 passing over the weighbridge 3 also passes through the two detector stations 1 and 2. As will be described the two detector stations 1 and 2 provide electrical outputs to data processing means 5 which provides as its output a signal representative of overall vehicle length. This output together with an output from the weighbridge data unit 6 representative of gross vehicle weight is fed to a data base 7 in a freight office and from which a print-out of these items of information together with other vehicle data can be obtained. The data base may have provision for feeding its information to a central computer.

The detector stations 1 and 2 are spaced a predetermined distance apart (e.g. 2 meters). Each station comprises a pair of posts 8 and 9 disposed on opposite sides of the path of vehicle travel. The posts 8 each carry a vertical series of infra-red radiation emitting diodes 10 spaced for example 0.2 meters apart and each producing a constant radiation intensity output. Each of the diodes 10 incorporates a lens system so that it produces a conically diverging beam of infra-red radiation, the cone angle being for example 10°. The posts 9 each carry a single infra-red detector diode 11, whose vertical position on the post 9 is adjustable for convenience in setting up the system. The diodes 10 are oriented so that their optical axes are directed at the detector diode 11 of the associated detector station. Thus a triangular curtain of infra-red radiation extends across the path of vehicle travel at each station as shown in FIGS. 1 and 2.

Each of the detector diodes 11 produces an electrical output representative of the intensity or quantity of the infra-red radiation incident upon it so that as long as any part of a vehicle is interrupting one of the radiation curtains the output from the associated diode 11 will be a "less than maximum intensity or quantity" signal. If therefore the data processing means fundamentally has the facility for measuring the time taken for output signals from each of the detectors 11 to move from "maximum intensity or quantity" back to "maximum intensity or quantity" through a continuous range of "less than maximum intensity or quantity", the length of a vehicle can be measured using the following two equations:

$$L \ 32 \ (t_{1R} - t_{1F})V \quad (1)$$

$$V = D/(t_{2F} - t_{1F}) \quad (2)$$

from which two equations:

$$L = (t_{1R} - t_{1F}) \cdot D/(t_{2F} - t_{1F}) \quad (3)$$

where $t_{1F}$ is the time in absolute terms at which the front of the vehicle interrupts the detector station 1, $t_{2F}$ is the time at which the front of the vehicle interrupts the detector station 2, $t_{1R}$ is the time at which the rear of the vehicle clears the detector station 1, $t_{2R}$ is the time at which the rear of the vehicle clears the detector station 2, L is the length of the vehicle, V is the velocity of the vehicle, D is the distance between the detector stations.

It will be appreciated from equation (3) that there is no need for an indication of vehicle velocity to be given. However a constant vehicle velocity has been assumed and this fact could introduce unacceptable errors into the length measurement if in fact the vehicle velocity does vary as it passes between the two detector stations 1 and 2. As will now be described the measuring system has an inbuilt facility for determining, in effect an average vehicle velocity of transit so that, within limits changes in vehicle velocity of transit are compensated for in the length measurement.

As a vehicle passes through each of the radiation curtains each cross-section of the vehicle will interrupt a certain number of infra-red beams so that on a time base a radiation intensity or quantity pattern will be produced on the associated detector diode 11 and this will be reflected in the output from the detector diode. Such intensity or quantity patterns from the two detector stations are shown superimposed in FIG. 4. Using pattern recognition techniques therefore certain features of the vehicle can be recognised, for example as annotated on FIG. 4 where the front of the vehicle cab 100, the cab body 101, the wheels 102, 104 and 105 and the trailer body 103 are indicated. Hence a number of velocity measurements can be made for different points along the vehicle length and an average velocity derived for use in equation (3). Thus the general equation for vehicle velocity corresponding to equation (2) is $$V = D/(t_{2X} - t_{1X}) \quad (4)$$

Where $t_{1X}$ is the time in absolute terms at which a given point in the length of the vehicle interrupts the detector station 1 and $t_{2X}$ is the time at which said given point interrupts detection station 2.

FIG. 3 shows a block diagram of the data processing means 5 in which the outputs of the two detector diodes 11 are fed to an interface unit 12 which includes an analogue-to-digital converter for converting the analogue output signals from the diodes 11 to equivalent digital values. Under the control of the micro-computer 13 either of these digital values can be fed into the micro-computer store. The operator's console 14 has a keyboard and display which enable the operator to initiate the measuring process, to select which measurements are required (e.g., "length", "number of axles"), and to supply data such as the vehicle registration. With this information, the micro-computer receives and stores the sequence of radiation intensity or quantity values from the detectors 11, computes the desired measurements using the quoted equations and causes these measurements to be printed by the printer on the operator's console 14, and transmitted to the Freight Office data base 7.

With the length measurement system described above a narrow band optical filter is advantageously placed in front of each of the detector diodes 11 to block radiation other than that in the infra-red zone of the spectrum. Any problems with reflected light can be overcome by time modulating the output of the radiation emitting diodes at a fixed frequency and tuning the detectors to this frequency. Such modulation can conveniently be achieved by switching a d.c. supply to one station's light-emitting diodes for alternate half cycles of said predetermined frequency and to the second station's light-emitting diodes for the other half cycles.

In the above described system a single detector 11 is used at each detector station. In a modification two or more detectors may be used, a respective group of the infra-red emitting diodes 10 having their optical axes directed at each of the detectors. FIG. 5 shows one such arrangement in which two detectors referenced $11^1$ and $11^{11}$ are use, one at the same level as in FIG. 2 and the other at a relatively low level. The upper group of diodes referenced $10^1$ have their optical axes directed at the detector $11^1$ and the lower group of diodes referenced $10^{11}$ have their optical axes directed at the detector $11^{11}$.

The quantity of radiation falling on the two detectors $11^1$ and $11^{11}$ is summed and produces a pattern for the vehicle similar to that shown in FIG. 4. The advantage of having a plural detector arrangement as shown in FIG. 5, is that it enables recognition of the lower part of the vehicle more accurately and thus for example provides a more reliable axle count arrangement. In fact the detect $11^{11}$ and its associated group of electrodes 10 could be used alone for axle counting.

We claim:

1. A measuring system comprising:
   (a) a pair of detector stations spaced a predetermined distance apart along a path of movement of vehicles moving at varying velocities, each detector station comprising a vertically extending series of electromagnetic radiation emitters disposed on one side of said path, each emitter producing a directional beam of radiation, and at least one electromagnetic radiation detector means for producing an electrical output signal related to the quantity or intensity of radiation incident upon it, said detector means being disposed on the other side of said path and said emitters or a group of said emitters being arranged to direct their beams at it, whereby said quantity or intensity of incident electromagnetic radiation registered by said detector means is characteristic of the point along the length of a passing vehicle which is intercepting said beams at a given time; and
   (b) data processing means for processing the output signals from said detector means on a time basis and utilising the known predetermined spacing of said detector stations to provide a velocity related vehicle measurement.

2. A measuring system according to claim 1 wherein each emitter produces a directional beam of infra-red radiation.

3. A measuring system according to claim 2 wherein each emitter produces a conically diverging beam of electromagnetic radiation, the cone angle being about 10°.

4. A measuring system according to claim 1, wherein each detector station has a plurality of vertically spaced electromagnetic radiation detectors and the electromagnetic radiation emitters are divided into a number of groups equal to the number of detectors the emitters of each said group being arranged to direct their beams of radiation at a respective detector.

5. A measuring system, comprising:
a pair of detector stations spaced a predetermined distance apart along a path of movement of vehicles moving at varying velocities, each detector station comprising a vertically extending series of electromagnetic radiation emitters disposed on one side of said path, each emitter producing a directional beam of radiation, and at least one electromagnetic radiation detector means for producing an output signal related to the quantity or intensity of radiation incident upon it, said detector means being disposed on the other side of said path and said emitters or a group of said emitters being arranged to direct their beams at it, whereby said quantity or intensity of incident electromagnetic radiation registered by said detector means is dependent upon the number of said beams intercepted by a passing vehicle and thus the output signal of said detector is characteristic of the point along the length of a passing vehicle which is intercepting said beams at a given time; and data processing means responsive to the output signals from both said detectors for determining the velocities at which at least two points along the length of a passing vehicle traverse said predetermined distance and for averaging said velocities to determine an average velocity of a passing vehicle over said predetermined distance.

6. A measuring system according to claim 5, wherein each emitter produces a directional beam of infra-red radiation.

7. A measuring system according to claim 6, wherein each emitter produces a conically diverging beam of electromagnetic radiation, the cone angle being about 10°.

8. A measuring system according to claim 5, wherein each detector station has a plurality of vertically spaced electromagnetic radiation detectors and the electromagnetic radiation emitters are divided into a number of groups equal to the number of detectors, the emitters of each said group being arranged to direct their beams of radiation at a respective detector.

9. A measuring system, comprising:
a pair of detector stations spaced a predetermined distance apart along a path of movement of vehicles moving at varying velocities, each detector station comprising a vertically extending series of electromagnetic radiation emitters disposed on one side of said path, each emitter producing a directional beam of radiation, and at least one electromagnetic radiation detector means for producing an output signal related to the quantity or intensity of radiation incident upon it, said detector being disposed on the other side of said path and said emitters or a group of said emitters being arranged to direct their beams at it, whereby said quantity or intensity of incident electromagnetic radiation registered by said detector is dependent upon the number of said beams intercepted by a passing vehicle and thus the output signal of said detector is characteristic of the point along the length of a passing vehicle which is intercepting said beams at a given time; and data processing means responsive to the output signals from both said detectors for determining the length of a passing vehicle using the time required for the vehicle to pass one of said detector stations and the vehicle velocity as determined from the time required for a given point along the length of the vehicle to traverse said predetermined distance.

10. A measuring system according to claim 9, wherein each emitter produces a directional beam of infra-red radiation.

11. A measuring system according to claim 10, wherein each emitter produces a conically diverging beam of electromagnetic radiation, the cone angle being about 10°.

12. A measuring system according to claim 9, wherein each detector station has a plurality of vertically spaced electromagnetic radiation detectors and the electromagnetic radiation emitters are divided into a number of groups equal to the number of detectors, the emitters of each said group being arranged to direct the beams of radiation at a respective detector.

13. A measuring system according to claim 9, wherein said data processing means determines the velocities at which at least two points along the length of a passing vehicle traverse said predetermined distance and averages the at least two velocities to determine an average velocity of a passing vehicle to be used in determining its length.

14. A measuring system according to claim 13, wherein said at least two points are recognized by the characteristic radiation quantity or intensity which they cause to be registered on said detectors.

* * * * *